United States Patent
Schneider et al.

(10) Patent No.: US 7,028,735 B2
(45) Date of Patent: Apr. 18, 2006

(54) METHOD AND APPARATUS FOR PRODUCING ELASTOMERIC NONWOVEN LAMINATES

(75) Inventors: Uwe Schneider, Mason, OH (US); Christoph Johann Schmitz, Euskirchen-Stotzheim (DE); Martin Geoffrey Scaife, Köln (DE)

(73) Assignee: The Procter & Gamble Company, Cincinnati, OH (US)

( * ) Notice: Subject to any disclaimer, the term of this patent is extended or adjusted under 35 U.S.C. 154(b) by 366 days.

(21) Appl. No.: 10/452,438

(22) Filed: Jun. 2, 2003

(65) Prior Publication Data
US 2004/0238105 A1 Dec. 2, 2004

(51) Int. Cl.
*B29C 65/54* (2006.01)
*B32B 37/12* (2006.01)

(52) U.S. Cl. ............ 156/436; 156/495; 156/500; 156/550

(58) Field of Classification Search ............ 156/164, 156/244.22, 244.26, 535, 496, 436, 495, 156/500, 550
See application file for complete search history.

(56) References Cited

U.S. PATENT DOCUMENTS

| | | | |
|---|---|---|---|
| 3,468,748 A | 9/1969 | Bassett | |
| 3,575,782 A | 4/1971 | Hansen | |
| 4,720,415 A | 1/1988 | Vander Wielen et al. | |
| 4,917,746 A * | 4/1990 | Kons et al. | 156/164 |
| 5,143,679 A | 9/1992 | Weber et al. | |
| 5,156,793 A | 10/1992 | Buell et al. | |
| 5,167,897 A | 12/1992 | Weber et al. | |
| 5,385,775 A | 1/1995 | Wright | |
| 5,693,165 A | 12/1997 | Schmitz | |
| 5,814,178 A * | 9/1998 | Jacobs | 156/290 |
| 5,964,973 A * | 10/1999 | Heath et al. | 156/161 |
| 6,248,851 B1 | 6/2001 | Maugans et al. | |
| 6,916,750 B1* | 7/2005 | Thomas et al. | 442/104 |
| 2002/0019616 A1* | 2/2002 | Thomas | 604/373 |

FOREIGN PATENT DOCUMENTS

| | | |
|---|---|---|
| EP | 0 985 394 B1 | 9/1995 |
| WO | WO 92/16366 A | 10/1992 |
| WO | WO 01/87589 A2 | 11/2001 |
| WO | WO 01/88245 A2 | 11/2001 |

* cited by examiner

*Primary Examiner*—Gladys J.P. Corcoran
*Assistant Examiner*—Jayme L Brown
(74) *Attorney, Agent, or Firm*—Jay Krebs; Ken Patel; Steve Miller

(57) ABSTRACT

An apparatus and method for producing an elastomeric nonwoven laminate including a plurality of elastic strands joined to a nonwoven web in a controlled distribution is provided. The apparatus includes an extruder for extruding a plurality of elastic strands onto a cooled surface of a rotating drum, which transports the strands in parallel alignment to a nip formed between two rollers rotating about parallel axis. The drum transfers the plurality of strands to the nip in a controlled distribution where it is bonded with the nonwoven.

12 Claims, 4 Drawing Sheets

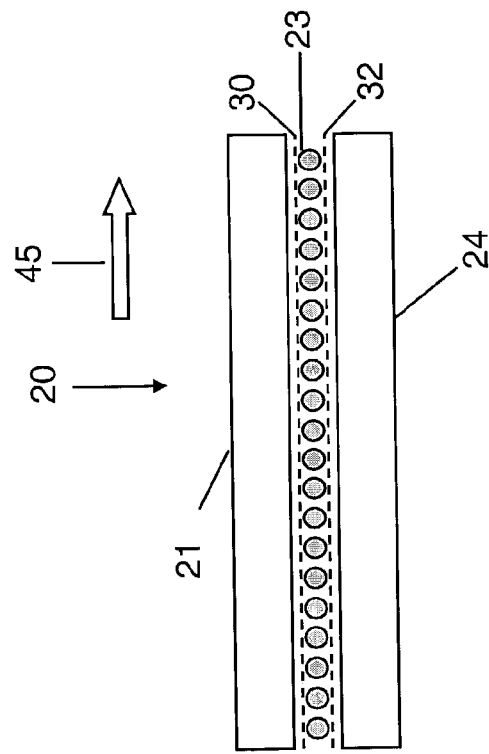
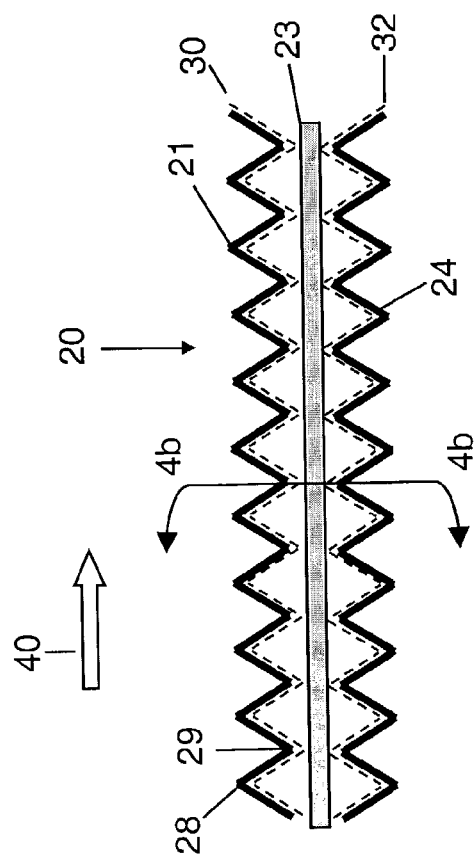
Figure 4b
Figure 4a

METHOD AND APPARATUS FOR PRODUCING ELASTOMERIC NONWOVEN LAMINATES

FIELD OF THE INVENTION

The present invention relates to a method and apparatus for manufacturing an elastomeric nonwoven laminate. More particularly, the present invention relates to an apparatus for manufacturing an elastomeric nonwoven laminate comprising a plurality of elastic strands and nonwoven material.

BACKGROUND

Disposable fluid-handling articles are often produced on high-speed converting lines using continuous webs of fabrics, films, foams, elastics, etc. Many of these articles preferably include an elastic region or component. Typically the elastic component is covered on at least one side, and preferably two sides, by a nonwoven. This combination of nonwoven and elastic is referred to hereinafter as an elastomeric nonwoven laminate.

Elastomeric nonwoven laminates typically include elastic bonded to a nonwoven. The elastic may include elastic film or elastic strands, however, elastic strands are generally preferred over elastic films since strands require less material and provide flexibility in arrangement and stretch properties. In one such laminate, a plurality of elastic strands is joined to a nonwoven while the plurality of strands is in a stretched condition so that when the elastic strands relax, the nonwoven gathers between the locations where it is bonded to the elastic strands forming corrugations. The resulting laminate is stretchable to the extent that the corrugations allow the elastic to elongate. Such a laminate is disclosed in U.S. Pat. No. 4,720,415 to Vander Wielen, et al., issued Jan. 19, 1988.

Elastomeric nonwoven laminates with elastic strands may be produced by extruding a plurality of heated filaments onto a conveyor or roller where the filaments are cooled and transferred to a nonwoven. Alternatively, the plurality of strands may be unwound from a supply roll and joined to a nonwoven. In either case, arranging the strands uniformly on the nonwoven can be difficult. The elastic strands are typically transferred to the nonwoven and bonded by passing the combination through a nip formed between two rolls. During the transfer to the nonwoven, the elastic strands are typically unsupported. Due to vibrations and speed of operation, the strands tend to fall out of alignment, overlap, entangle, and bundle with neighboring strands. In addition the unsupported strands can break or stick to the conveyor and not transfer to the nonwoven at all. Broken strands can build up on equipment such as a conveyor or transfer roll which eventually results in downtime.

Consequently, it would be beneficial to provide a method and apparatus for producing an elastomeric nonwoven laminate that is capable of placing the plurality of continuous elastic strands in a controlled distribution on the mating nonwoven. In addition, it would be beneficial to provide a method and apparatus capable automatically capturing and threading elastic strands that fail to transfer to the nonwoven.

SUMMARY OF THE INVENTION

The present invention provides an apparatus and method for producing an elastomeric nonwoven laminate including a plurality of elastic strands bonded to a nonwoven web in a controlled distribution. The apparatus includes an extruder for extruding a plurality of elastic strands on a cooled surface of a drum, which conveys the plurality of strands to a first roller forming a nip with a second roller. The first nonwoven is supplied from a first nonwoven source to the second roller. The first roller is positioned close to the cooled surface of the drum to receive the plurality of elastic strands while allowing for a minimal span of unsupported strands during the transfer. The apparatus may include a second nonwoven source supplying a second nonwoven having a second bonding surface to the first roller forming the nip with the second roller. For this embodiment, the plurality of elastic strands is conveyed directly onto the second bonding surface as the second nonwoven passes over the first roller. The first and second nonwovens pass through the nip in a face-to-face arrangement at second velocity $V2$ sandwiching the elastic strands therebetween conveyed from the cooled surface of the drum at first velocity $V1$ where $V2$ is greater than $V1$.

In a preferred embodiment, the apparatus includes an idler roller located proximate to the cooled surface of the drum counterclockwise from the point where the plurality of strands are transferred to the first roller. The idler roller directs the first bonding surface of the first nonwoven into contact with the cooled surface of the drum enabling the first bonding surface to remove elastic strands that stick to the cooled surface of the drum and fail to transfer to the first roller. After having swept the cooled surface of the drum, a pivot roller located adjacent to the second roller forming the nip, reverses the direction of the first nonwoven enabling any strands collected on the first bonding surface to be expelled therefrom. A series of rollers directs the first nonwoven first away from the pivot roller and then back around to the second roller forming the nip by first passing the first bonding surface beneath the pivot roller to recollect the elastic strands expelled at the pivot roller. Sweeping the cooled surface of the drum not only keeps the drum surface clean of elastic strands, but also provides a means for threading the plurality of elastic strands to the first roller during start up.

In an alternate embodiment, an elastomeric nonwoven laminate comprising a first and second nonwoven sandwiching a plurality of elastic strands therebetween can be made to proceed from the nip to at least two pairs of rollers forming S-wraps. The first pair of rollers forming the S-wrap rotates at a speed providing a surface speed which is approximately equal to $V2$. The second pair of rollers forming the S-wrap rotates at a speed providing a surface speed $V3$ that is greater than $V2$. The acceleration overstrains the laminate resulting in additional stretch.

BRIEF DESCRIPTION SHOWN IN THE DRAWINGS

While the specification concludes with claims particularly pointing out and distinctly claiming the subject matter that is regarded as the present invention, it is believed that the invention will be more fully understood from the following description taken in conjunction with the accompanying drawings. None of the drawings are necessarily to scale.

FIG. 2 is a schematic side elevation view of an apparatus for laminating a first nonwoven and a second nonwoven with a plurality of elastic strands sandwiched in between.

FIG. 4a is a side view of the elastomeric nonwoven laminate produced on the apparatus depicted in FIGS. 1 through 3.

FIG. 4b is a cross sectional view of the elastomeric nonwoven laminate depicted in FIG. 4a.

DETAILED DESCRIPTION OF THE INVENTION

Figure 1:
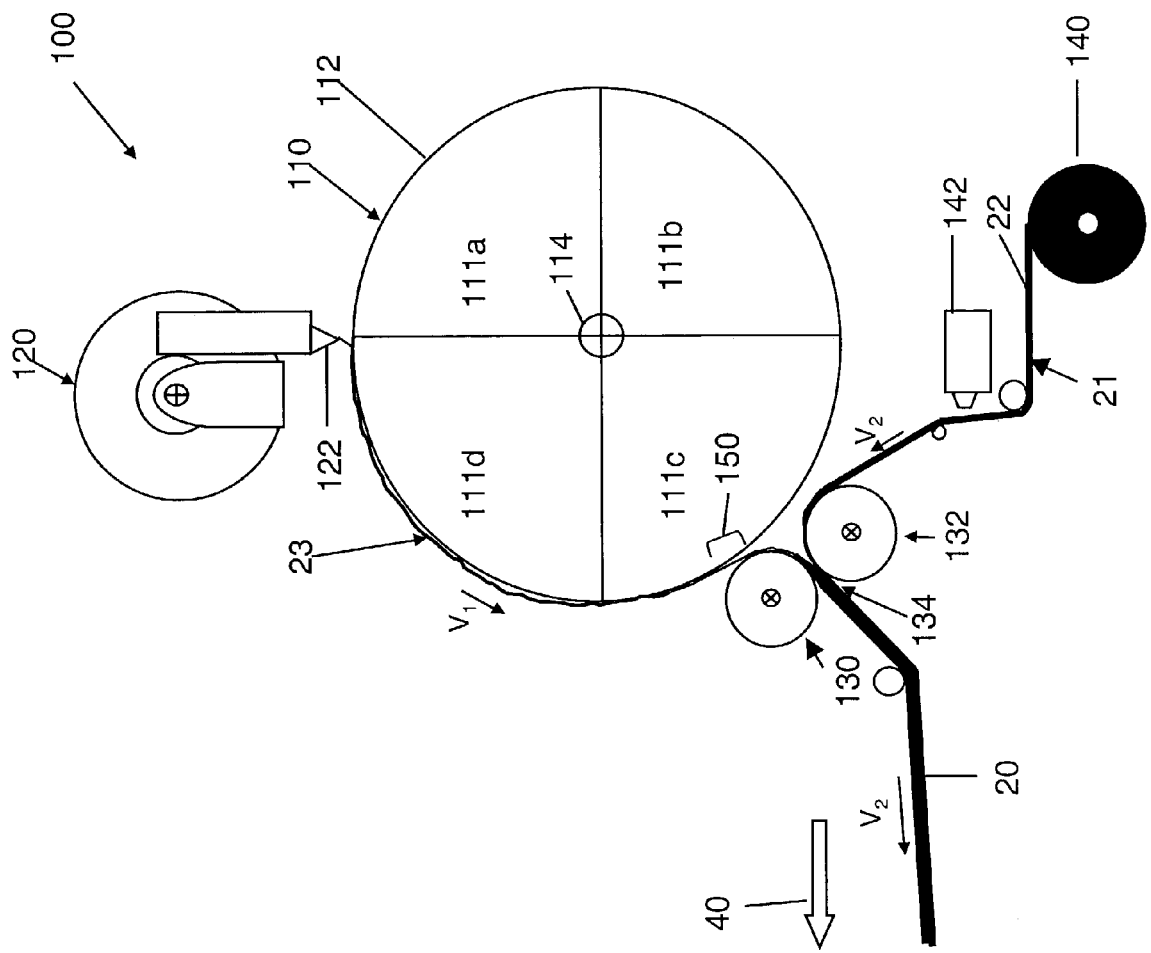
FIG. 1 is a schematic side elevation view of an apparatus for laminating a nonwoven and a plurality of strands of elastic forming an elastomeric nonwoven laminate according to the present invention.

The method and apparatus of the present invention are designed to provide a more consumer desirable elastomeric nonwoven laminate suitable for use in a variety of articles including a disposable fluid-handling article. The elastomeric nonwoven laminate comprises a nonwoven and elastic composed from at least one layer of a plurality of elastic strands and at least one layer of a nonwoven material. The method and apparatus are capable of efficiently producing an elastomeric nonwoven laminate having a controlled distribution of elastic strands.

Definitions

The following terminology is used herein consistent with the plain meaning of the terms with further details provided in the present specification.

"Live stretch" includes stretching elastic and bonding the stretched elastic to a nonwoven. After bonding the stretched elastic is released causing it to contract, resulting in a "corrugated" nonwoven. The corrugated nonwoven can stretch as the corrugated portion is pulled to about the point that the nonwoven reaches at least one original flat dimension.

"Continuous filaments" refers to strands of continuously formed polymeric filaments. Such filaments are formed by extruding molten material through a die head having a certain type and arrangement of capillary holes therein.

"Controlled distribution" refers to a parallel arrangement of elastic strands having no overlapping or bundles of strands where the variation in distance between the elastic strands from the point of extrusion to the point of lamination is minimal.

A "converting facility" refers to any production equipment producing one or more components of a disposable fluid-handling article that are subsequently assembled into a finished disposable fluid-handling article. It may also produce a finished disposable fluid-handling article that is complete for use by a consumer.

An "elastic," "elastomer" or "elastomeric" refers to polymers exhibiting elastic properties. They include any material that upon application of a force to its relaxed, initial length can stretch or elongate to an elongated length more than 10% greater than its initial length and will substantially recover back to about its initial length upon release of the applied force.

An "extrusion apparatus" or "extruder" refers herein to any machine capable of extruding a molten stream of material such as a polymeric through one or more extrusion dies.

The term "extrude" or "extruding" refers herein to a process by which a heated elastomer is forced through one or more extrusion dies to form a molten stream of elastic that cools into a solid.

The term "molten stream" refers herein to a linear deposit of a heated liquid material such as a polymeric exiting an extrusion apparatus. The stream may include continuous filaments, discontinuous fibers, or continuous films of a polymeric material. When cooled, the molten stream forms an elastic strand.

The term "joined" herein encompasses configurations whereby a material or component is secured directly or indirectly (by one or more intermediate members) to another material or component. An example of indirect joining is an adhesive. Direct bonding includes heat and or pressure bonding. Joining may include any means known in the art including, for example, adhesives, heat bonds, pressure bonds, ultrasonic bonds, and the like.

The term "nonwoven" refers herein to a material made from continuous (long) filaments (fibers) and/or discontinuous (short) filaments (fibers) by processes such as spunbonding, meltblowing, and the like. Nonwovens do not have a woven or knitted filament pattern.

Nonwovens are typically described as having a machine direction and a cross direction. The machine direction is the direction in which the nonwoven is manufactured. The cross direction is the direction perpendicular to the machine direction. Nonwovens are typically formed with a machine direction that corresponds to the long or rolled direction of fabrication. The machine direction is also the primary direction of fiber orientation in the nonwoven.

FIG. 1 shows a side view of an apparatus 100 according to the present invention for producing elastomeric nonwoven laminate 20. The apparatus 100 includes a drum 110 rotating about an axis 114 and having a surface speed $V_1$. The drum 110 is glycol cooled to provide a cooled external surface 112. The temperature of the cooled external surface is maintained between 0° C. and 5° C. For orientation purposes, the drum 110 has a first quadrant 111a between 12 o'clock and 3 o'clock, a second quadrant 111b between 3 o'clock and 6 o'clock, a third quadrant 111c between 6 o'clock and 9 o'clock, and a fourth quadrant 111d between 9 o'clock and 12 o'clock.

The drum 110 can be sized to accommodate any size laminate or process set up. For instance a larger drum 110 may be utilized for offline material production operations where the elastomeric nonwoven laminate is stored on a roll or in a box for future use. Smaller drum sizes may be required for online operations incorporated upstream of a converting operation. For offline operations, the diameter of the drum may be approximately one meter or larger, whereas for online operations the diameter of the drum may be approximately 0.5 meters or less. Similarly for offline operations, the width of the drum may be approximately one meter or larger whereas for online operations the width of the drum may be limited to approximately one meter or less. The rotation of the drum 110 can be powered by a variable speed motor capable of ramping up or down depending on the operator's demand.

The apparatus 100 includes an extruder 120 for extruding a molten stream of elastomeric polymer. The extruder 120 extrudes the molten stream of polymer through a plurality of nozzles 122 forming a plurality of elastic strands 23 that flow in parallel alignment onto the cooled surface 112 of the rotating drum 110. Preferably, the elastic strands are extruded onto the cooled surface 112 of the drum 110 such that the distance between any two adjacent strands ranges between about 1 mm and about 3 mm. More preferably, the distance between any two adjacent strands is about 1.5 mm. The extruder 120 is mounted between the first and fourth quadrants 111a, 111d and deposits the plurality of strands 23 onto the cooled surface 112 of the drum 110 near 12:00 o'clock.

The extruder 120 preferably includes a built in metering pump, valve and nozzle arrangement wherein the metering pump and valve are positioned in proximity to the nozzle in order to provide a controlled discharge of polymer. The controlled discharge of polymer ensures that an adequate supply of polymer is supplied to the cooled surface of the drum particularly during starts and stops. Excessive flow of polymer during stops can cause localized heating of the cooled surface of the drum which can lead to polymer build up caused by the elastic strands sticking to the surface of the drum.

First and second rollers 130, 132 are mounted near the cooled surface 112 of the drum 110 at the third quadrant 111c. The first and second rollers 130, 132 rotate about two parallel axes forming a nip 134 therebetween, where each provides a surface speed V2. The surface speed V2 of each of the rollers is greater than the surface speed V1 of the drum.

The first roller 130 is positioned proximate to the cooled surface 112 of the drum 110 to minimize the span 150 of unsupported strands transferring from the cooled surface 112 of the drum 110 to the first roller 130. Preferably, the first roller is positioned as close to the cooled surface of the drum as possible without actually making contact. The actual measured distance separating the two depends upon the sizes of the drum and the first roller. For instance, for a drum diameter of 1 meter and a first roller diameter of 150 mm, the distance between the cooled surface 112 of the drum 110 and the first roller 130 can range from approximately 0.5 mm to about 5 mm. The corresponding length of the span 150 of unsupported strands can range from about 18 mm to about 75 mm. For smaller size drums, the length of the span 150 of unsupported strands can be shorter. For instance, a 0.5 meter diameter drum with a 150 mm first roller 130 can enable the first roller 130 to be positioned as close as 1 mm to the cooled surface 112 of the drum 110 and limit the length of the span 150 of unsupported strands to about 22 mm.

The first roller 130 receives the plurality of strands 23 near the cooled surface 112 of the drum 110, minimizing the span 150 of unsupported strands between the cooled surface 112 of the drum 110 and the first roller 130. Preferably, the plurality of strands 23 transfers from the cooled surface 112 of the drum 110 to the first roller such that the strands are approximately tangent to both the cooled surface of the drum and the surface of the first roller 130 and the length of the span 150 of unsupported elastic strands 23 is minimal, ranging between about 10 mm and about 200 mm. Preferably, the length of the span 150 of unsupported elastic strands 23 during the transfer ranges between about 20 mm and about 50 mm. By minimizing the length of the span of unsupported strands during the transfer, the elastic strands can be transferred to the first roller in a controlled distribution where the distance measured between any two adjacent strands varies 30% or less from the point of extrusion to the point of lamination. For instance, if the original spacing at the extruder is set at 1 mm, the spacing between any two adjacent strands will range between 0.7 mm to 1.3 mm.

A first nonwoven source 140 supplies a first nonwoven 21 having a first bonding surface 22 to the second roller 132 forming the nip 134 with the first roller 130. A first adhesive source 142 positioned between the first nonwoven source 140 and the second roller 132 applies adhesive to the first bonding surface 22. The first nonwoven 21 and the plurality of elastic strands 23 pass between the nip 134 formed by the first and second rollers 130, 132 forming the laminate. The difference in velocity between surface velocity V1 of the cooled surface 112 of the drum 110 and the surface velocity V2 of the first and second rollers 130, 132 strains the plurality of elastic strands 23 at the nip. Once the swain is relieved from the strands, corrugations form in the nonwoven providing an elastomeric nonwoven laminate 20.

Upon exiting the nip 134, the elastomeric nonwoven laminate 20 may be conveyed directly to a converting operation which manipulates the laminate to form a component of a disposable absorbent article such as an elastic waist band, an elastic cuff or an elastic side panel. Alternatively, the elastomeric nonwoven laminate 20 may be joined with a second nonwoven or other material and stored on a roll or in a box for future use.

Exposed adhesive on the first bonding surface 22 between the elastic strands 23 resulting from the process of joining the plurality of strands 23 to the first bonding surface 22 can hinder any down stream converting operation and can make storing the elastomeric nonwoven laminate on a roll virtually impossible. Consequently, it is preferred to cover the elastic strands 23 that are exposed on the first bonding surface 22 of the first nonwoven 21. Such covering may include a flexible release paper joined to the first bonding surface 22 downstream of the nip 134. The release paper can enable the laminate to be stored on a roll and can be removed in a subsequent operation.

Figure 2:
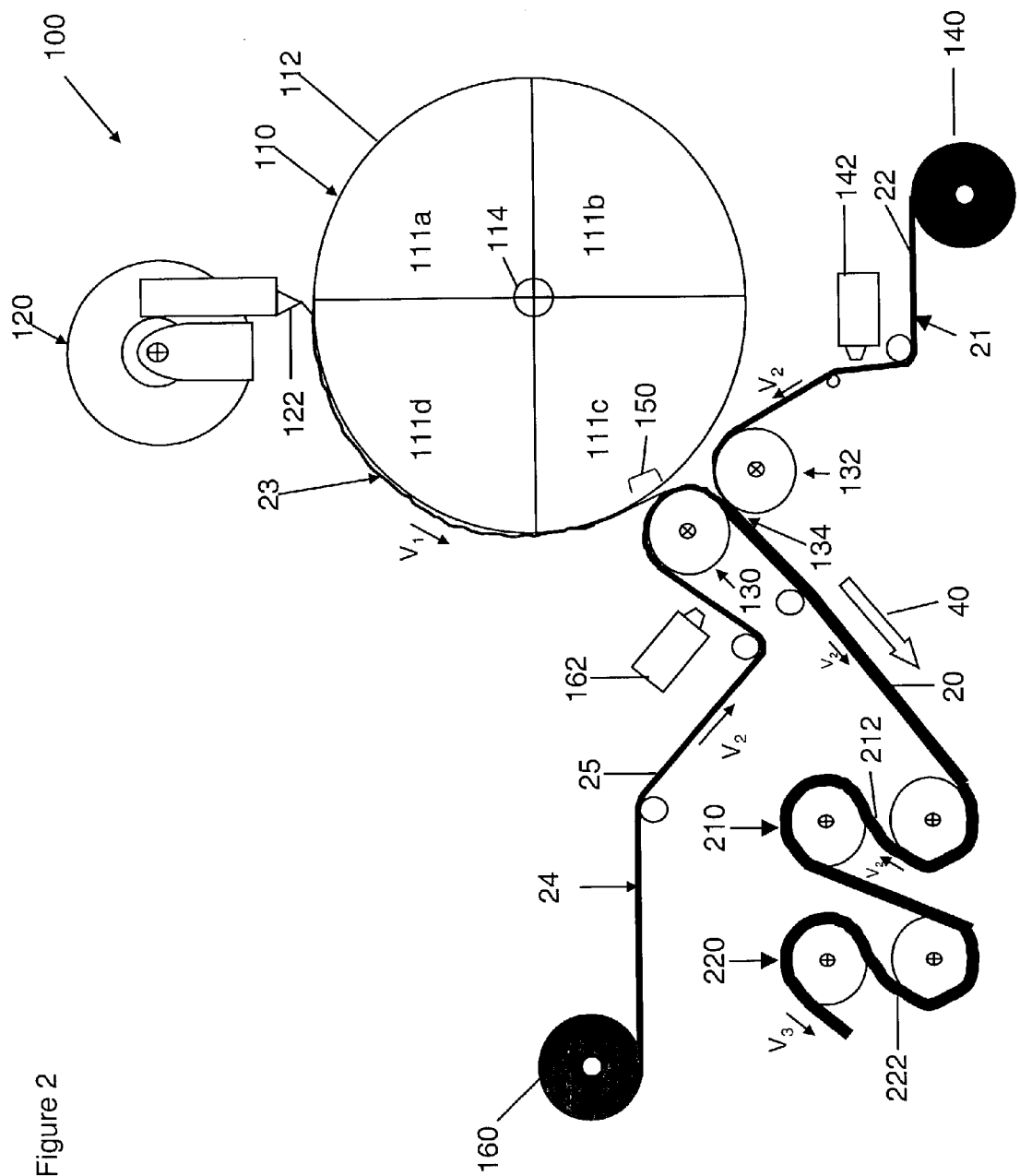

Alternatively, a second nonwoven source 160 may be provided supplying a second nonwoven 24 to be joined with the first nonwoven 21 and plurality of elastic strands 23. As shown in FIG. 2, the second nonwoven source 160 supplies a second nonwoven 24 having a second bonding surface 25 to the first roller 130 forming the nip 134 with the second roller 132. A second adhesive source 162 positioned between the second nonwoven source 160 and the first roller 130 applies adhesive to the second bonding surface 25. The first and second nonwovens 21, 24 pass between the nip 134 formed by the first and second rollers 130, 132 sandwiching the plurality of elastic strands 23 therebetween. At the nip 134, a first strain is produced on the elastic strands 23 as a result of being extended in the machine direction 40. The strain is induced as a result of the difference in velocity between the elastic strands 23 traveling on the cooled surface 112 of the drum 110 at first velocity V1 and the first and second nonwovens 21, 24 traveling on the second and first rollers 132, 130, respectively, at second velocity V2. The greater the velocity differences between the first velocity V1 and the second velocity V2, the greater the resulting strain. For the present invention, the difference in velocity creates a strain on the plurality of elastic strands 23 ranging from about 20° to about 500°.

Upon exiting the nip 134, the extensibility of the elastomeric nonwoven laminate can be further enhanced by overstraining the web. For instance, in the embodiment shown in FIG. 2, the elastomeric nonwoven laminate 20 is exposed to a second strain by passing the laminate through at least two pairs of rotating rollers 210, 220 forming S wraps downstream of the nip 134. The first pair of rollers 210 forming the first S wrap 212 provides a surface speed V2 and the second pair of rollers 220 forming the second S wrap 222 provides a surface speed V3 which is greater than V2. The increase in velocity experienced by the laminate as it is conveyed through the S wraps 212, 222 overstrains the laminate 20 which can increase the extensibility of the laminate at least 20%

Conveying elastic strands from the extruder to the first roller via a rotating drum is difficult to maintain over an extended period of time as a result of buildup on the drum caused by elastic strands having the tendency to break and stick to the surface of the drum failing to transfer to the first roller. In addition, manual threading of the elastic strands from the cooled surface of the drum to the first roller is often required at start up since the light weight of the elastic strands causes them to stick to the surface of the drum rather than automatically making the transfer onto the first roller. Consequently, an alternate embodiment is provided in FIG. 3 including an additional apparatus for maintaining the cleanliness of the roll during normal operation and automatically threading the strands during start up. Although the embodiment illustrated in FIG. 3 produces an elastomeric laminate comprising a first and second nonwoven 21, 24 the apparatus is equally applicable to the apparatus illustrated in FIG. 1 for making an elastomeric nonwoven laminate comprising a single nonwoven.

Figure 3:
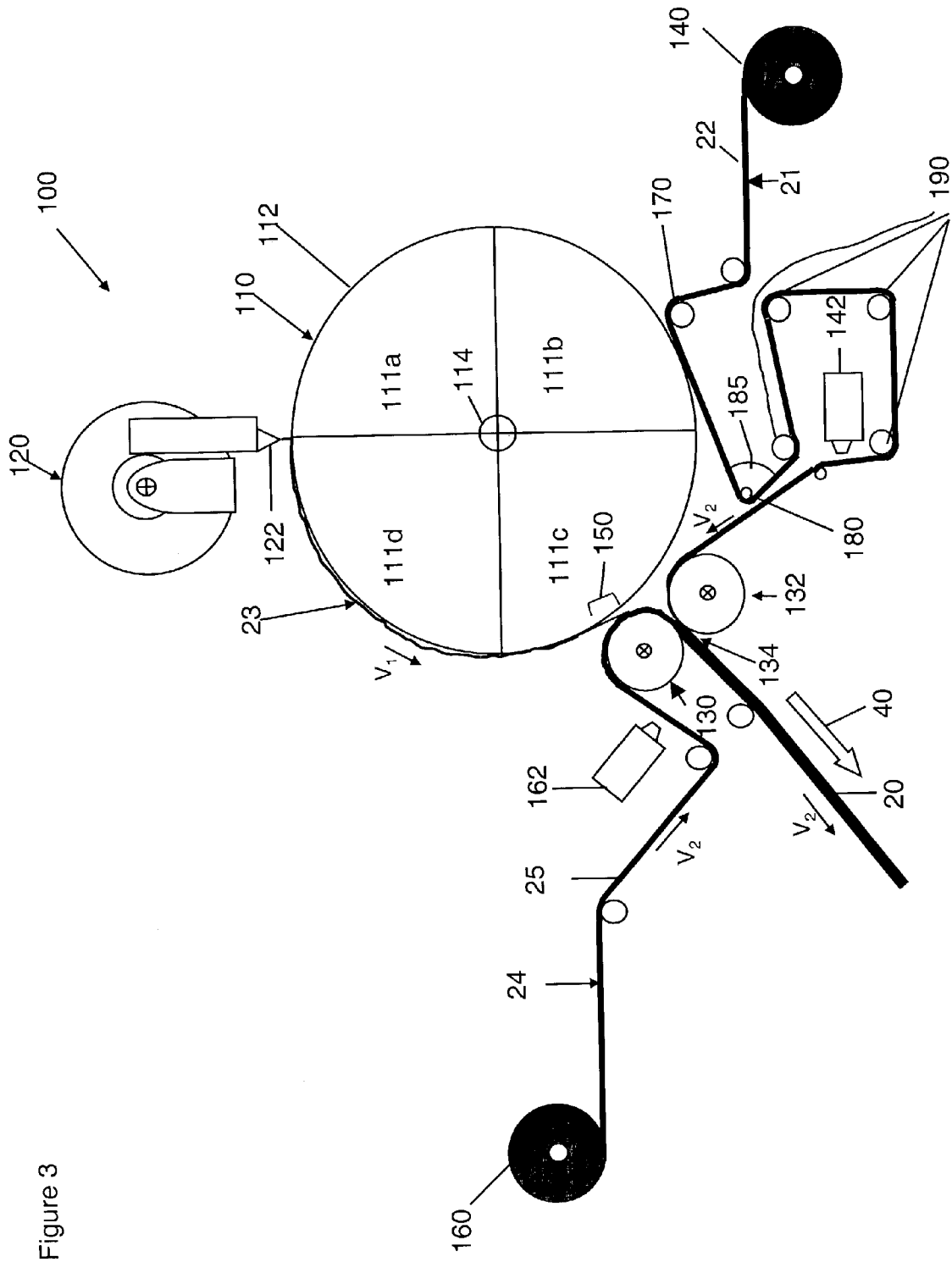
FIG. 3 is a schematic side elevation view of the apparatus in FIG. 2 including features which enable the first nonwoven to swipe the drum clean of residual elastic strands in advance of joining with the plurality of elastic strands at the nip.

As shown in FIG. 3, an idler roller 170 is positioned between the first nonwoven source 140 and the second roller 132, which is disposed adjacent to the second quadrant 111b of the cooled surface 112 of the drum 110. The idler roller 170 directs the first bonding surface 22 of the first nonwoven 21 into contact with the cooled surface 112 of the drum 110 in advance of reaching the second roller 132. By making contact with the cooled surface 112 of the drum 110, the first bonding surface 22 can remove elastic strands that stick to the cooled surface 112 of the drum 110 and fail to transfer to the nip 134 formed by the first and second rollers 130, 132.

After removing stray strands from the cooled surface 112 of the drum 110, the first nonwoven 21 can be made to proceed to a pivot roller 180 located adjacent to the second roller 132 forming the nip 134, a select distance from the idler roller 170. The pivot roller 180 can be arranged to force the first nonwoven 21 in a reverse direction near the second roller 132 causing any stray strands collected from the cooled surface 112 of the drum 110 to expel from the first bonding surface 22. The pivot roller is preferably small having a diameter which is less than about 20 mm. In an alternate embodiment, the pivot roller can be replaced with a static plate or sheet, however, a roller is preferred since a static plate or sheet can induce strain on the nonwoven causing necking.

From the pivot roller 180, the first nonwoven 24 can be made to proceed to a series of rollers 190. The series of rollers 190 are arranged relative to the pivot roller 180 such that the angle 185 between first nonwoven 21 approaching the pivot roller 180 and the first nonwoven 21 departing the pivot roller 180 ranges from 0 degrees to 90 degrees. As shown in FIG. 3, the series of rollers 190 directs the first nonwoven 21 first away from the pivot roller 180 and then back to the second roller 132 forming the nip 134 along a path which passes the first bonding surface 22 beneath the pivot roller 180 so that any strands expelled from the first bonding surface 22 at the pivot roller 180 can be recollected onto the first bonding surface 22 prior to reaching the second roller 132. The series of rollers 190 can also be arranged to direct the first nonwoven 21 to a first adhesive applicator 142 applying a first adhesive to the first bonding surface 22 prior to passing beneath the pivot roller 180.

Forcing the first bonding surface 22 of the first nonwoven 21 to make contact with the cooled surface 112 of the drum 110 in the second quadrant 111b has other advantages such as enabling the apparatus to automatically thread itself during initial start up. During initial start up, the elastic strands 23 are not heavy enough to automatically separate from the cooled surface 112 of the drum 110 and transfer to the first roller 130. As a result, the elastic strands 23 stick to the cooled surface 112 of the drum 110, bypassing the first roller 130 in the third quadrant 111c. By forcing the first bonding surface 22 into contact with the cooled surface 112 of the drum 110 in the second quadrant 111b, the elastic strands 23 are removed from the cooled surface 112 of the drum 110 and redirected to the nip 134 formed between the first and second rollers 130, 132.

In one embodiment, the plurality of elastic strands 23 sandwiched between the first and second nonwovens 21, 24 are exposed to a second strain by passing the elastomeric laminate through at least two pairs of rotating rollers 200 forming S wraps positioned downstream of the nip 134. The first pair of rollers 210 forming the first S wrap 212 provides a surface speed V2 and the second pair of rollers 220 forming the second S wrap 222 provides a surface speed V3 that is greater than V2. The increase in velocity overstrains the laminate 20 which can increase the extensibility of the laminate at least 20%.

An elastomeric nonwoven laminate produced using the apparatus and method 0f the present invention is illustrated in FIGS. 4a and 4b. FIG. 4a shows, in exaggerated form, the corrugation of the first and second nonwovens 21, 24 with corrugation hills 28 and corrugation valleys 29 that occur after the first and second nonwovens 21, 24 are joined to the elastic strands 23 via adhesive 30, 32, respectively. Corrugation is used to describe irregular corrugation hills 28 end corrugation valleys 29 that alternate. As shown, the first and second nonwovens 21, 24 are corrugated in the cross direction 45 with the corrugation hills 28 and corrugation valleys 29 alternating in the machine direction 40. Once a strain is placed on the elastomeric laminate 20 in the machine direction 40, the corrugations enable the first and second nonwovens 21, 24 to extend with the plurality of elastic strands 23 at least to the point of reaching the force wall, which is about where the corrugations flatten out. As the strain is removed, the plurality of elastic strands 23 contact back toward their original, relaxed length. This contraction causes the observed first and second nonwoven 21, 24 corrugations.

Strain is measured as the percent of length increase in the plurality of elastic strands 23 under load. For example a strand with a free and stretchable strand length of 15 centimeters (cm) may have a load applied such that the 15 cm strand elastic is now 18 cm long. This length increase of 3 cm is 20% of 15 cm (3/15), or a 20% strain. The elastomeric nonwoven 20 produced according to the present invention may have a strain ranging from about 20% to about 500%, preferably from about 100% to about 400%, and more preferably from about 200% to about 400%.

Since the primary function of the elastomeric nonwoven laminate 20 is to be stretchable, the elastomeric nonwoven laminate 20 is capable of at least a 50% strain prior to reaching the force wall. Although the force wall has generally been described as the point where the corrugations nearly flatten out, the force wall typically occurs when the force required for a 10% increase in strain increases at least about 20%. Depending upon design choice and the particular application of the elastomeric nonwoven laminate, the elastomeric nonwoven laminate 20 can be made to endure a strain greater than 50%, 100%, 200%, or 300% prior to reaching the force wall. Preferably, the elastomeric nonwoven laminate 20 produced according to the present invention is capable of at least a 100% strain prior to reaching the force wall. More preferably, the elastomeric nonwoven laminate 20 is capable of at least a 200% strain prior to reaching the force wall.

The first nonwoven 21 and the second nonwoven 24 may comprise any nonwoven material known in the art. The first nonwoven 21 and the second nonwoven 24 may comprise fibers made of polypropylene, polyethylene, polyester, nylon, cellulose, polyamide, or combinations of such materials. Fibers of one material or fibers of different materials or material combinations may be used in the first and/or second nonwoven 21, 24.

Any process known in the art may be used to make the first nonwoven 21 and/or the second nonwoven 24. Exemplary processes include spunbond, spunbond meltblown spunbond (SMS), spunbond meltblown meltblown spunbond (SMMS), carded and the like. Particularly acceptable nonwovens include high elongation carded (HEC) nonwovens and deep activation polypropylene (DAPP) nonwovens.

The first nonwoven 21 and the second nonwoven 24 may comprise fibers that are bonded internally, including fibers that are needle punched, hydro entangled, spun bonded, thermally bonded, bonded by various types of chemical bonding such as latex bonding, powder bonding, and the like. Preferably, the basis weight of the first nonwoven 21 and/or second nonwoven 24 is in the range of about 10 gsm to about 30 gsm.

The elastic strands 23 preferably extend in a parallel uniformly spaced arrangement between the first nonwoven 21 and the second nonwoven 24. However, the elastic strands 23 may be arranged in any configuration desired. For instance, the strands may be arranged to provide a specific force profile in the elastomeric nonwoven laminate 20 by varying the thickness of the individual strands or the spacing between them.

In addition, the shape of the elastic strands 23 is not limited. For example, typical elastic strands 23 have a circular cross sectional shape, but sometimes the plurality of elastic strands may have different shapes, such as a trilobal shape, or a flat (i.e., "ribbon" like) shape. Further, the thickness or diameter of the elastic strands 23 may vary in order to accommodate a particular application.

The plurality of elastic strands 23 is preferably made of a resiliently elastic thermoplastic material. The elastic strands may be made from liquid elastic that can be extruded through a die to achieve a desired strand elastic diameter and/or shape. The elastic strands are preferably styrene block copolymers, polyurethane or latex rubber having a diameter ranging between about 0.15 mm and about 0.5 mm and a density ranging from about 600 kg/m$^3$ to about 1250 kg/m$^3$.

Although the first nonwoven 21, second nonwoven 24 and plurality of elastic strands 23 have been described as adhesively bonded, they may be joined by any joining means known in the art. Some examples of suitable joining means and/or methods for joining include, but are not limited to, adhesives, cohesives, thermal bonding, pressure bonding, mechanical bonds, ultrasonic bonding, radio frequency bonds and/or any combination of any known methods of joining such materials.

All documents cited herein are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An apparatus for producing a nonwoven elastomeric laminate composed of at least one nonwoven and a plurality of elastic strands, the apparatus comprising:
   a) a surface cooled drum rotating about an axis and having a surface speed $V_1$, the surface cooled drum having a first quadrant between 12 o'clock and 3 o'clock, a second quadrant between 3 o'clock and 6 o'clock, a third quadrant between 6 o'clock and 9 o'clock, and a fourth quadrant between 9 o'clock and 12 o'clock;
   b) an extruder extruding a plurality of elastomeric strands in parallel alignment onto the cooled surface of the drum between the first and second quadrants;
   c) first and second rollers forming a nip therebetween wherein the first roller is positioned proximate to the cooled surface of the drum, the first and second rollers each having a surface speed $V_2$ wherein the surface speed $V_2$ is greater than the surface speed $V_1$, wherein the drum transfers the plurality of elastic strands to the first roller wherein a span of unsupported strands between the cooled surface of the drum and the first roller is minimized to provide a controlled distribution of elastic strands entering the nip;
   d) a first nonwoven source supplying a first nonwoven having a first bonding surface to the second roller forming the nip;
   e) a first adhesive source for applying adhesive to the first bonding surface in advance of the nip,
   f) an idler roller positioned adjacent to the cooled surface of the drum between the first nonwoven source and the second roller, the idler roller directing the first bonding surface to make contact with the cooled surface of the drum so that the first bonding surface removes strands from the cooled surface of the drum that inadvertently fail to transfer to the first roller forming the nip;
   g) a pivot roller located adjacent to the second roller that forms the nip a select distance from the idler roller, the pivot roller enabling the first nonwoven to reverse direction near the second roller causing the strands collected from the cooled surface of the drum to expel from the first bonding surface; and
   h) a series of rollers positioned near the pivot roller, the series of rollers arranged to direct the first nonwoven first away from the pivot roller and then back to the second roller forming the nip while passing the first bonding surface beneath the pivot roller to collect the broken elastic strands expelled at the pivot roller onto the first bonding surface prior to entering the nip.

2. The apparatus according to claim 1 wherein the extruder comprises a built in metering pump, valve and nozzle arrangement wherein the metering pump and valve are positioned in proximity to the nozzle to provide a controlled discharge of polymer, limiting the flow of polymer during starts and stops.

3. The apparatus according to claim 1 wherein the span of unsupported strands between the cooled surface of the drum and the first roller is tangent to both the cooled surface of the drum and the first roller.

4. The apparatus according to claim 1 wherein the span of unsupported strands between the cooled surface of the drum and the first roller is between about 10 mm and about 200 mm.

5. The apparatus according to claim 1 wherein the span of unsupported strands between the cooled surface of the drum and the first roller is between about 20 mm and about 50 mm.

6. The apparatus according to claim 1 wherein the idler roller and pivot roller are arranged in sequence such that the first bonding surface of the first nonwoven contacts the cooled surface of the drum in the second quadrant between the idler roller and the pivot roller.

7. The apparatus according to claim 1 wherein the series of rollers are arranged relative to the pivot roller such tat the angle between first nonwoven approaching the pivot roller and the first nonwoven departing the pivot roller ranges from 0 degrees to 90 degrees.

8. The apparatus according to claim 1 wherein a distance measured between any two adjacent elastic strands joined to the first bonding surface of the first nonwoven varies less than 30% from the distance measured between the same two adjacent elastic strands extruded from the extruder in parallel alignment onto the cooled surface of the drum.

9. The apparatus according to claim 1 further comprising a second nonwoven source supplying a second nonwoven having a second bonding surface to the first roller forming the nip, wherein the first and second bonding surfaces of the first and second nonwovens are joined in a face-to-face arrangement at the nip, sandwiching the plurality of elastic strands therebetween in a controlled distribution.

10. The apparatus according to claim 9 further comprising a second adhesive source located between the second nonwoven source and the first roller forming the nip for applying adhesive to the second bonding surface in advance reaching the nip.

11. The apparatus according to claim 9 further comprising at least two pairs of rollers forming two S wraps positioned in sequence with the nip wherein the rotation of the first pair of rollers provides a surface speed V2 and wherein the rotation of the second pair of rollers provides a surface speed V3 which is greater than V2.

12. The apparatus according to claim 11 wherein the S wraps overstrain the elastomeric nonwoven laminate, increasing the extensibility by at least 20%.

\* \* \* \* \*